April 16, 1963  H. E. SORENSEN  3,085,593
CARGO TRANSFER APPARATUS
Filed May 19, 1960  3 Sheets-Sheet 1

Harry E. Sorensen   Inventor
By W. D. Heilman
Patent Attorney

April 16, 1963 H. E. SORENSEN 3,085,593
CARGO TRANSFER APPARATUS
Filed May 19, 1960 3 Sheets-Sheet 2

Harry E. Sorensen  Inventor

By W. O. Heilman

Patent Attorney

April 16, 1963  H. E. SORENSEN  3,085,593
CARGO TRANSFER APPARATUS
Filed May 19, 1960  3 Sheets-Sheet 3

Harry E. Sorensen  Inventor
By W. O. Heilman
Patent Attorney

.

United States Patent Office 3,085,593
Patented Apr. 16, 1963

3,085,593
CARGO TRANSFER APPARATUS
Harry E. Sorensen, 49 Mansion Terrace, Cranford, N.J.
Filed May 19, 1960, Ser. No. 30,158
18 Claims. (Cl. 137—615)

The present invention relates to an apparatus for the transfer of fluids and pipeline transferable cargo. Particularly, the invention is concerned with a substantially balanced cargo transfer device having automatic controls. More particularly, the invention is concerned with a substantially balanced marine loading and unloading apparatus for the transfer of marine cargoes, which device has automatic controls adjusting the device to all marine vessel movements.

Marine loading equipment sometimes referred to as cargo transfer devices or hose handling rigs have normally been mounted on wharves and docks and supported by a combination of cranes with multiple pulley and cable arrangements. These cranes and the pipe connections between the marine vessel and the shore have required substantial and expensive supporting structures, and usually place undesirable weight on the tanker manifolds. These shore facilities have in the past thus required cumbersome, complex and expensive operating equipment, which has required excessive manpower to operate and maintain.

It is the object of the present invention to overcome many of the foregoing difficulties and other problems in present cargo transfer devices, and to reduce and simplify the structural and operating requirements and equipment needed for the transfer of the cargo. In particular, it is an object of this invention to reduce the need for substantial supporting structural equipment and to provide for a fully automatic operation of the cargo transfer (or apparatus). More particularly, it is an object of this invention to provide for a balanced or substantially balanced marine transfer apparatus, so as to prevent excessive weight on the marine vessel manifolds, and so as to allow the device to assume a rest position in the event of any operating failure. These and other objects will be apparent from the more detailed description of the invention which follows and which will be more fully understood from the accompanying drawings.

Figure 1:
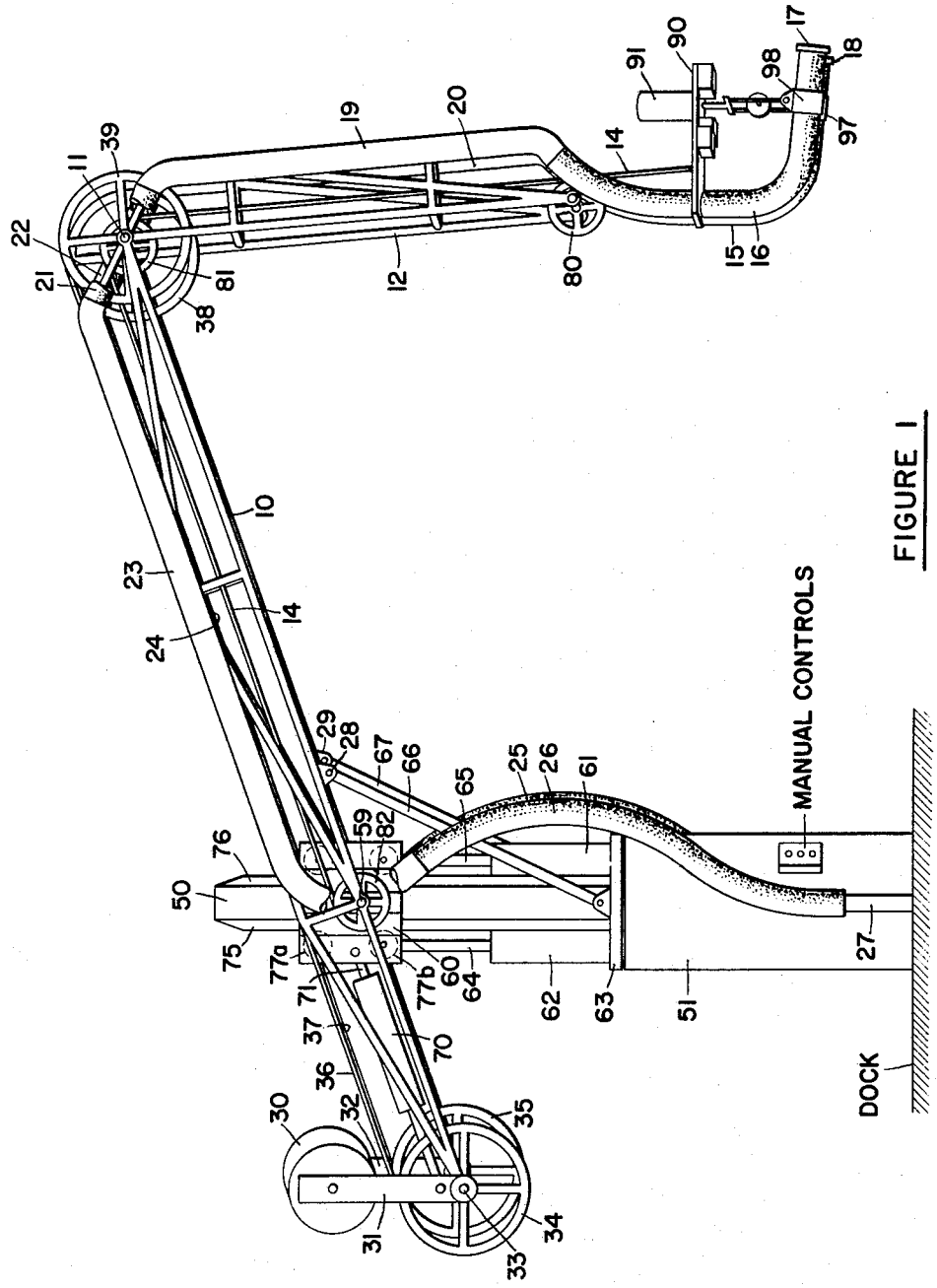
FIGURE 1 is an isometric view of the entire inventive apparatus in an extended operating position.

Turning first to FIGURE 1 wherein the inventive apparatus is shown in an extended operating position, the inner boom arm 10, composed of trusses and ribs, is shown pivotally connected with an outer boom arm 12, similarly constructed, so as to allow the outer boom arm to pivot about the apex pivot rod 11 in a substantially vertical plane. The outer boom arm 12 has located at its opposite end a control platform 90, said platform being supported in a substantially horizontal and level position as shown with the aid of a platform cable 14, one end of which is rigidly secured to the control platform. Also supporting and extending through the rear section of said control platform are two flexible fluid transfer hoses 15 and 16, which hoses serve as a conduit for the transfer of the fluid into or from the fluid container. One end of said hoses has manifold connections 17 and 18 for securing said conduit hoses to a marine vessel tanker manifold, which is not shown in the drawing or to the manifold of any suitable container or transporting unit. The other end of said hoses communicates with a dual set of rigid pipe conduits 19 and 20 which are attached to and run parallel to the outer boom arm structure, connecting with two flexible hoses structures 21 and 22 near the apex pivot point. The central portions of said flexible hoses have been cut away to show other features of the invention. The hoses then communicate with rigid pipe conduits 23 and 24 which are attached to and run parallel to the structure of the inner boom arm, the lower section of which near the elbow turn has been cut away to show other features of the invention, and then communicating with another set of flexible pipe or hose conduits 25 and 26 which connect to the shore line connections at 27 and another connection not shown, but on the opposite side of 27. Cargo thus is enabled to flow from 27 and the other inlet source to or from the manifold connections 17 and 18 along the supporting structure of the inner and outer boom arms.

The inner boom arm has at its farther and lower end a counterbalancing mechanism comprising a counterweight 30 mounted on rotatable parallel counterweight arms 31 and 32, which are pivoted to an inner boom pivot rod 33 at the end of the inner boom arm. Rigidly attached to the inside of the two rotatable counterweight arms are two rotatable inner boom cable sheaves 34 and 35, which are also pivotally mounted about the common pivot rod 33, so that rotational movement of the inner boom cable sheaves about the pivot rod will produce a proportional rotational counterbalancing movement of the counterweight arms and counterweight. Movement of the cable sheaves 34 and 35 is accomplished by woven wire cables 36 and 37, which cables are rigidly secured to the lower portion of the cable sheaves, and which thence run approximately parallel to each other from the said inner boom cable sheaves to the apex cable sheaves 38 and 39 located about and on the opposite ends of the apex pivot rod 11. The apex cable sheaves are rotatably mounted about the apex pivot rod, but are rigidly secured to the outer boom arm, with the parallel cables from the inner boom cable sheaves secured to the lower portion of the apex cable sheaves. The above arrangement of rotatable cable sheaves and cables allows the outer boom arm to be counterbalanced in all operating positions, i.e. when moved out of a substantially vertical position, and provides means for the outer boom arm to be moved about the apex pivot rod. Forward or backward movement in a substantially vertical plane of the outer boom arm about the apex pivot point produces proportional rotational movement of the apex cable sheaves, the inner boom cable sheaves and the counterweight arm and counterweight so as to counterbalance the outer boom arm in any operating position.

Figure 3:
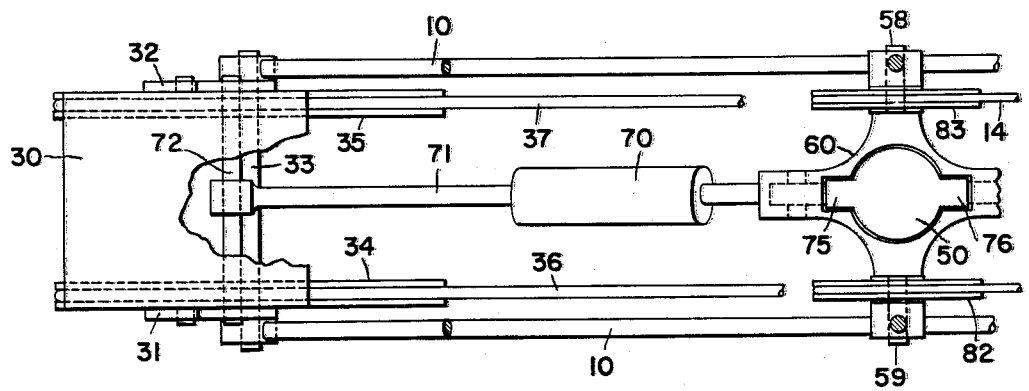
FIGURE 3 is a top view of the counterbalancing mechanism of the inventive apparatus.

The inner boom arm is pivotally secured at the main pivot points 58 and 59 (58 is not shown on FIGURE 1, but is similar to 59 and on opposite side and is shown in FIGURE 3) in the central area of a carriage 60, which carriage is slidably mounted on a two-rail column 50 for reciprocal vertical movement. The carriage 50 is a structural unit encircling the column, and is slidably mounted on the opposing column rails 75 and 76 by wheels mounted on each side of the said column rails and within the carriage structure. The column is mounted above a support base 51, which is rigidly mounted to a dock, foundation, wharf, or other rigid supporting structure. Vertical reciprocal movement of the carriage and the inner boom arm on the column is accomplished by the inner boom fluid operating cylinders 61 and 62, which are securely mounted on a platform 63 mounted above the support base. The cylinders are located substantially beneath the carriage and substantially parallel to the rails of the column, so as to provide suitable and direct motive means to raise and lower the carriage unit and inner boom structure. The base platform 63 by means of a slewing motor located inside the support base or other motive power means can rotate so as to provide longitudinal horizontal motion of the base platform, inner boom cylinders, carriage, column, and inner boom arm and attached structure. The operating rods 64 and 65 of the inner boom cylinders 61 and 62 are secured to the lower section of the carriage so as to provide vertical reciprocal movement of the carriage and inner boom arm as desired. Pivotally attached to the lower section of the column and the base platform and to the lower section of the forward part of the inner boom structure at support leg pivot points 28 and 29 are two inner boom support legs 66 and 67 of fixed length. These support legs serve to provide support and weight distribution for the inner boom arm when it is placed in any extended position by the vertical upward movement of the slidably mounted carriage, and to provide for the positive forward movement of the inner boom arm. From the foregoing description, it can be seen that the counterbalancing of the outer boom is accomplished by proportional rotation of the counterweight system, that the inner boom arm is slidably mounted on a column, and thus the boom arms are capable of reciprocal vertical motion, and that the longitudinal motion of the inner and outer arms is accomplished by means of a slewing motor located in the support base on which is mounted the horizontally rotatable base platform.

Turning now to the cable means for supporting the control platform, cable 14, supporting the control platform 90, runs over a small rotatable cable sheave 80 on the further end of the outer boom arm, thence through a small rotatable cable sheave 81 mounted about the apex pivot rod 11, and located between the larger apex cable sheaves 39 and 38, thence along the inner boom arm to a Y fork and then each cable arm of the Y runs to small fixed carriage cable sheaves 82 and 83 not shown in FIGURE 1, but in FIGURE 3, mounted on opposite sides of the carriage where the cable ends are rigidly fastened to the lower section of the carirage. This cable arrangement above described provides support for the control platform and maintains it in a substantially level horizontal position regardless of the position of either the inner and/or outer boom arm.

Figure 2:
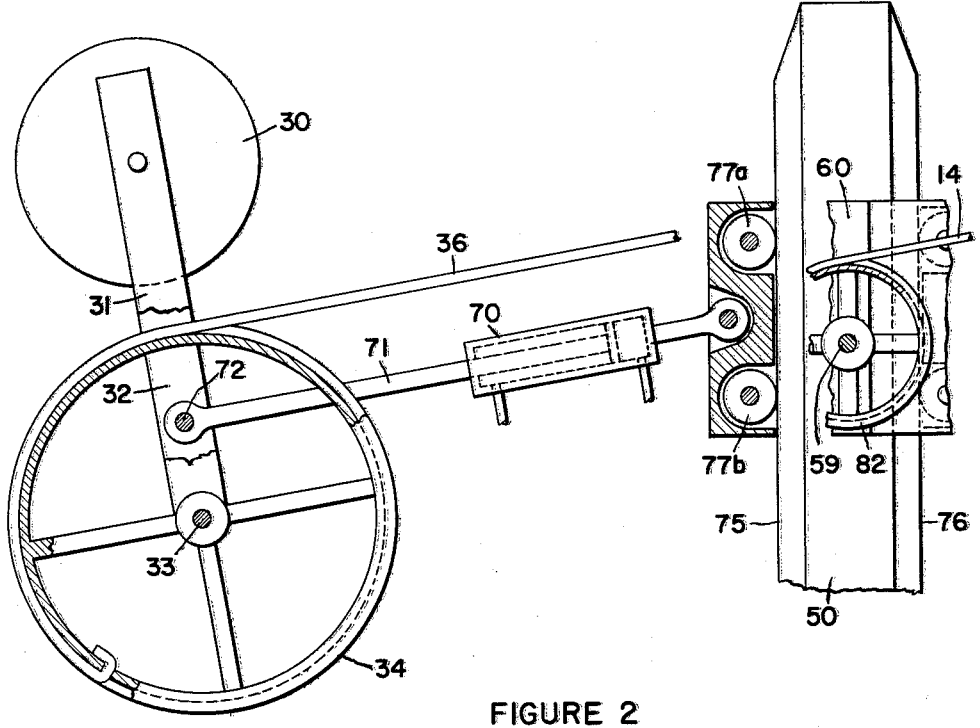
FIGURE 2 is a side view of the counterbalancing mechanism of the inventive apparatus.

Turning now to FIGURES 2 and 3, there is shown in more detail the counterbalancing mechanism located in FIGURE 1 on the rearward section of the inner boom arm. Located between the pivot rod 33 and the carriage 60 is an outer boom fluid operating cylinder 70 securely and pivotally attached at one end to the carriage while at the other end by the cylinder rod 71 attached to a bar arm 72, which bar arm is rigidly mounted and secured at each end to the inside of the rotatable cable sheaves 34 and 35, so that motive operation of the outer boom cylinder will, by the above structure, effect the forward and backward movement in a substantially vertical plane of the outer boom arm by the rotational movement of the cable sheaves 34 and 35. For example, extension of the cylinder operating arm 71 by the use of increased fluid operating pressure would force support bar 72 in a rearward direction, this rotational movement would also rotate the inner boom cable sheaves 34 and 35 in a similar direction and effect the forward movement of the outer boom arm by the increase in tension placed on cables 36 and 37. The movement of the outer boom arm would then be counterbalanced in all operating positions by the simultaneous rearward rotational movement of the counterweight 30, which movement is proportional to the movement of the cable sheaves 34 and 35. Thus, by the control of the outer boom operating cylinder, the position of the counterbalanced outer boom arm can be automatically placed in any desired operating position. From FIGURES 2 and 3 can also be seen more fully the method of slidably mounting the carirage 60 for reciprocal vertical movement on the post 50, by the use of column rails 75 and 76 on both sides of the post on which the carriage is mounted by the use of two wheels 77a and 77b on one side and a similar set of wheels on the other side of the carriage.

From the foregoing description, the operation of the transfer device may be more fully described. In the preferred practice, the apparatus is constructed so that the inner boom arm is slightly overbalanced in the rear counterweight section and the outer boom arm is slightly underbalanced so that when not in an extended operating position or upon a failure of operating controls when in an extended operating position, the inner and outer boom arms will each gradually assume by means of gravitational force a substantially vertical rest position. The term "substantially counterbalanced" will be used to designate that condition wherein either one or both of the boom arms is not fully counterbalanced. In the substantially counterbalanced apparatus, the failure of the motive means of operating the apparatus or when the apparatus is in a free unbiased state, gravity would allow the apparatus to assume a rest position. A rest position is that position wherein the inner boom arm has its counterbalanced end in the low position so that the inner and outer boom arms are in a substantially vertical position. In the preferred form of the invention, the inner boom arm and the outer boom arm, when in a substantially vertical position, would be overbalanced either full or empty to the extent of not more than approximately 105%, where about 100% represents a state of true counterbalance. In addition, the outer boom arm would be underbalanced either full or empty to the extent of not more than approximately 95%. Thus, on failure of the motive means, the overbalanced inner arm would tilt backward, while the underbalanced outer boom would return to a substantially vertical position. In the preferred form then, substantial counterbalancing means a counterbalancing force or means within 5% of a true absolute counterbalance. It is, of course, recognized that the apparatus can be constructed so that both the inner and outer boom arms or either one can be substantially counterbalanced in all operating positions. Longitudinal movement of the apparatus is accomplished by the rotation of the base platform by means of a slewing motor located within the support base. Movement of the outer boom arm in a vertical plane and the simultaneous counterbalancing or substantial counterbalancing of the outer boom arm is effected by the operation of the outer boom fluid cylinder, which by rotation of the inner boom cable sheaves to increase cable tension and to move the outer boom arm also effects a simultaneous rotational counterbalancing motion of the rotatable counterweight on the rear of the inner boom arm, so that forward and backward movement in a vertical plane and counterbalancing or substantial counterbalancing of the outer boom arm when moved out of a substantially vertical rest position is effected.

Hydraulic motive means can be used for all motions of the apparatus where rapid and positive movements are desired without the attending cushioning effects of pneumatic fluids. The ease of operating pneumatic devices from portable extraneous sources, such as pressurized gas cylinders, when the usual source of pneumatic power is nonoperative, renders pneumatic motive means suitable in some circumstances. Of course, although these means are preferred, other motive means, such as electrical motors, gasoline operated motors, and the like, are satisfactory and within the contemplation of the invention.

The rotation of the counterweight compensates for the change in the center of gravity of the outer boom arm by its movement from a substantially vertical rest position, so as to keep the sum of the moments about the outer boom arm at approximately zero. Thus, the weight of the counterweight and length of arm are a matter of choice depending upon whether a fully counterbalanced or substantially counterbalanced apparatus is desired. The inner boom arm and the outer boom arm when in a substantially vertical position are effectively counterbalanced or slightly overbalanced by the selection of the counterweight used to balance the outer boom arm in an extended position, and the amount and weight of the overhang position of the inner boom arm from the main pivot points on the carriage. Thus, the inner arm and outer arm in a substantially vertical rest position are counterbalanced by maintaining the sum of the moments about the main pivot points at zero or approximately zero or by allowing the inner boom arm to be slightly overbalanced in the rear depending upon the type of operation desired. The vertical operating position of the inner and outer boom arms is controlled by the operation of the inner boom arm fluid cylinders, which by extension and contraction of their operating rods raise and lower the carriage and the boom arms vertically. As the inner boom arm moves forward and downward in an extended position, by vertical upward movement of the carriage, the support legs pivot to provide support for the slightly overbalanced inner boom and to serve as additional pivot points to help distribute the overbalanced portion of the weight load of the inner arms in the extended position and the outer boom arm in the substantially vertical position. Thus, for the operation of the apparatus where the inner boom arm is slightly overbalanced, the excessive weight load of the inner boom is distributed between the main pivot points 58 and 59 and the two support leg pivot points 28 and 29. The fixed length of the support arms serves to help tilt the inner boom arm forward and to provide structural steadiness and flexibility when the inner boom cylinder rods force the carriage upward. In fully counterbalanced devices of the inventive apparatus, the support legs would serve for positive guidance and structural purposes alone. Since support legs are a desirable feature of both types of apparatus, flexibility in both operation fully counterbalanced or substantially counterbalanced is provided. From the foregoing, it can be seen that the single counterweight mass can be used to provide full or substantial counterbalancing means both for the outer boom arm in an operating position and for the inner boom arm and outer boom arm when in a substantially vertical position. This counterweight mass is also used in combination with a dual pivot point as above described when the preferred substantially counterbalanced apparatus is used.

In some types of operations, it may be desirable to provide for a fully counterbalanced inner boom arm and an underbalanced outer boom arm, so that on loss of power or other occasion, the outer boom arm instead of becoming slack will gradually assume a quasi vertical position. In this case then the combined weight of the overhang of the inner boom and the weight of the counterweight mass are chosen to counterbalance the inner boom arm, while the counterweight is slightly less than that required for full counterbalancing of the outer boom arm. Thus, the outer boom arm will be underbalanced in all operating positions.

The counterbalancing means for counterbalancing either fully or substantially the outer boom arms can be any suitable means of effecting counterbalancing, such as by torsional springs and the like. The counterweight means shown and described can, of course, be varied by varying the weight of the counterweight or by adjusting the length of the counterweight arms. The apparatus can be fully or substantially counterbalanced either empty or while full of the transfer cargo by suitable calculations relative to the density of the cargo and the volume of the transfer conduit employed. The counterweight means can be adjustable means for changing the length of the counterweight arm by manual or motive means, means for changing the weight of the counterweight by using suitable ballast, solid or liquid incorporated by manual or motive means, means for adjusting the amount of overhang of the inner boom arm, and the like.

Figure 4:
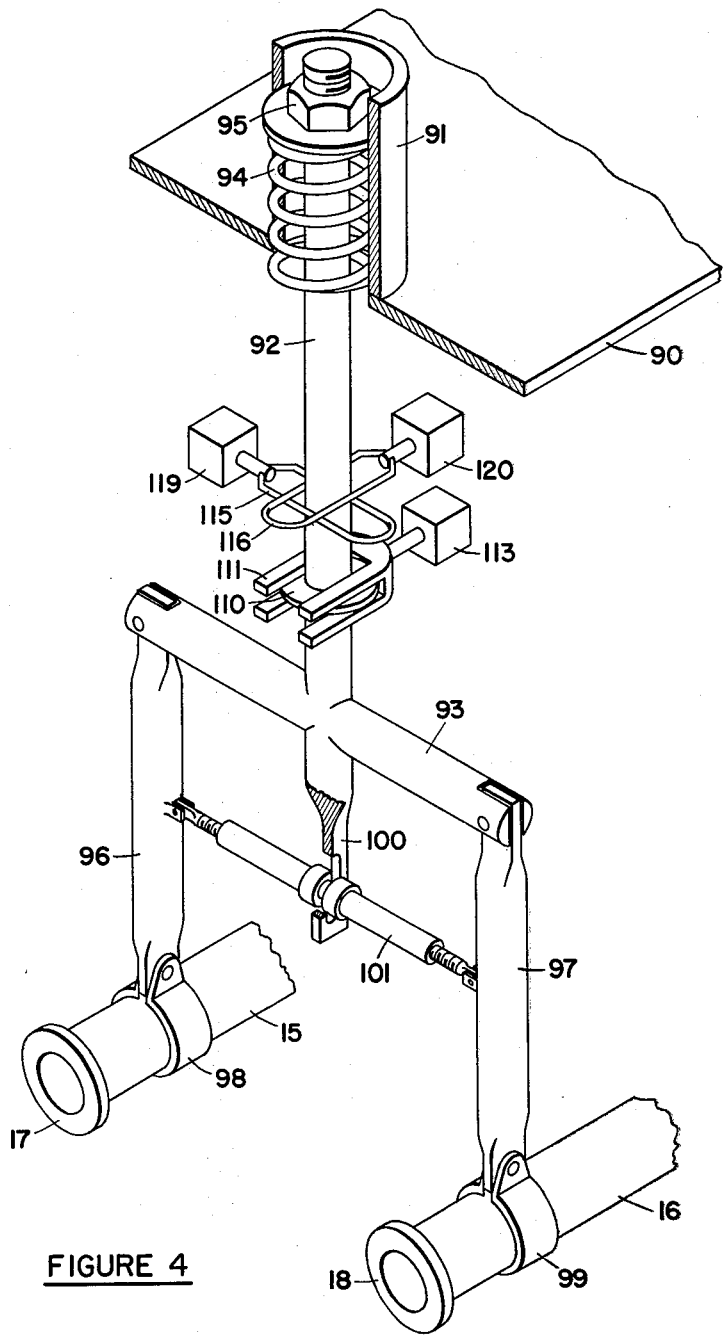
FIGURE 4 is an isometric view of the automatic control platform of the inventive apparatus.

Turning now to FIGURE 4 and the automatic control features of the invention, FIGURE 4 is an isometric view of the control platform with the control platform 90 itself. There is shown on the upper portion of the platform a cylindrical kingpin housing 91 within which is located a kingpin 92 which extends through a suitable aperture in the control platform, and is secured rigidly at its lower end to a horizontal yoke bar 93. Surrounding the kingpin within the cylindrical housing is a tension spring 94, and mounted on the upper threaded portion of the kingpin is an adjustable nut 95 to allow for adjustment of the spring tension. The yoke bar has pivotally connected at both ends of the bar vertical hose or pipe supporting arms 96 and 97, which are secured to the flexible fluid transfer conduits to the extreme end by conduit clamps 98 and 99. Rigidly extending from the horizontal yoke bar where the king pin joins the said bar is a tongue bar 100. The other end of this tongue bar is loosely connected to the center of an adjustable turnbuckle 101 which has adjusting nuts on either side of the tongue bar. As shown in the cutaway view of the apparatus in FIGURE 4, the connection of the tongue bar to the turnbuckle is somewhat loose, with space left above and below the connection to allow for various changes in the position of the horizontal turnbuckle when the manifold distance is varied. The ends of the turnbuckle are pivotally connected to the vertical support arms, so that adjustment of the turnbuckle will allow for the appropriate adjustment of the distance between the fluid conduits, so as to fit any tanker manifold. This adjustable turnbuckle thus allows for the conduit lines to be rapidly and efficiently adjusted to the varying tanker manifold distances.

The control features of the device are found located beneath the control platform. Surrounding and rigidly mounted to the kingpin so that its diameter is approximately perpendicular to the kingpin axis is a vertical control disc 110. This disc is located between the forked end of a vertical control lever arm 111, so that the forks are slightly above and below the disc. The other end of the lever arm is attached to the center pin of a three-way fluid pilot valve 113, which operatively communicates with the inner boom arm cylinders 61 and 62. As the tanker, and thus the tanker manifolds to which are connected the cargo transfer conduits, rises or falls due to tidal effects, the filling or emptying of the cargo and the like, the vertical control mechanism above described automatically adjusts to these vertical movements which would otherwise place stress and excessive weight on the tanker manifolds. For example, as the tanker rises, the kingpin, previously in a "neutral" position as originally set, moves upward so that the vertical disc on striking the upper fork of the vertical control lever arm causes slight upward movement of the lever arm. This vertical movement actuates the center pin of the three-way valve by tilting it off center and operates the inner boom cylinders. These cylinders then lower the carriage and raise the inner and outer boom arms until the disc returns to a neutral position between the forks of the lever arm and the center pin of the valve returns to a neutral nonoperating position. If the tanker causes the disc to strike the lower fork, then the inner boom cylinders are actuated to raise the carriage until the disc is in a neutral position. Instead of fluid being used to lower the carriage, it is, of course, also feasible to allow fluid to be expelled and the carriage to lower itself by gravity until the disc is in the neutral position.

Located slightly above the vertical control disc are the latitudinal and longitudinal automatic control mechanisms. The kingpin in a neutral position, i.e. the neutral position of the automatic control platform, and when in an operating position attached to the tanker manifolds, is enclosed by two elongated hair pin control stops 115 and 116. These control stops are at right angles to one another, and each one allows the kingpin substantial movement in one direction without touching the sides of the stop, while slight movement in a perpendicular direction would hit the control stops. These control stops are separately connected to three-way fluid valve 119 and a four-way fluid valve 120. Longitudinal motion of the device is controlled by the slewing motor. The longitudinal control device of control stop 116 and pilot valve 120 automatically corrects for the longitudinal variations of the tanker. When the kingpin is moved out of a neutral position by longitudinal movement, the kingpin moves freely in the slot of 115, but the slightest longitudinal motion causes the kingpin to strike the side of the control stop 116. This stop then, by pivotal movement, actuates pilot valve 120, which by sending a small amount of fluid, preferably air, into the appropriate portion of the slewing motor mechanism, actuates the slewing motor so as to restore the kingpin to a neutral position. Thus, longitudinal movements of the apparatus can be automatically adjusted to prevent excessive weight and strain on the tanker manifold. The horizontal control mechanism at substantially right angles to the above mechanism operates in a similar manner by actuating the outer boom cylinder, so as to keep the outer boom arm in a correct operating position. The valve 119 with the outer boom arm is similar to pilot valve 113 since the outer boom arm in an extended position can be withdrawn by gravity, fluid or by fluid expelled from the cylinder, or by being driven into position. Of course, with the slewing motor, fluid means are necessary for operation in both directions, since gravitational forces cannot be used. The actuating means employed are pilot valve means whereby the displacement of a center pin allows fluid to enter or be expelled from the valve; but, of course, other actuating means such as other valve means, solenoids, switches, motors, and the like can be suitably employed. Thus, as described, the present apparatus automatically compensates for all movements of the tanker, and the only stress and strain on the tanker manifold is that required to actuate the automatic valve means whereby the apparatus will automatically relocate itself.

On the support base of FIGURE 1 are shown manual controls for the directional control of the present apparatus. These manual controls are connected in parallel with the automatic controls, so that any mishandling of the rig will be corrected by the automatic controls, i.e., should manifold connections accidentally contact any foreign object. The manual control can, of course, be located at any location, and are used to direct the movement of the apparatus to contact range of the tanker manifold, and are used after disconnection to return the rig to the resting or nonoperating position.

In operation, the apparatus is guided to the tanker manifold or other container by one man operating the manual controls. This operation can commence as the tanker comes within range of the apparatus and contact and connections can be thus made even before the vessel is moored and the gangplank set. When contact is made with the tanker manifold, the automatic controls assume command of any further movement and eliminates any excess weight or stress on the tanker manifolds.

A second set of manual controls located on the control platform will permit a person to ride on the control platform to the deck of the ship to make the necessary connections even before the tanker is completely moored, and after transfer of the cargo, to return to dockside in a similar manner without awaiting the placement and removal of the gangplanks.

The substantial counterbalancing of the apparatus permits the apparatus to gradually retract to a resting position without a source of power. This feature provides a safety measure in the event of power failure.

Tubular structural members of the inner and outer boom arms can be used to transmit the operating power fluid (pneumatic or hydraulic) to the control platform. It is, of course, within the scope of this invention that the inner and outer boom arms can be the fluid conduit pipe itself without supporting structure as shown in FIGURE 1; thus, the inner and outer arms may be pipe conduits swivelly connected.

As described the cargo transfer apparatus is suitable for employment in transferring liquid, gaseous and solid cargo. Examples of suitable cargo would be petroleum products such as fuel oils, crudes, gasoline, liquefied petroleum gases, and the like gases; and dry, solid, freely flowing cargo such as wheat, which may be blown through the pipe conduits.

Some of the advantages of the present device can be thus seen to be (1) the counterbalancing arrangement whereby, in the event of power failure, the apparatus assumes a safe rest position; (2) an apparatus that is completely automatic in operation; (3) a light weight structure requiring a minimum of dock space; (4) automatic controls which compensate for all movements of the tanker and eliminate stresses and strain on the tanker manifolds; (5) substantial or full counterbalancing of the device in all operating positions so as to make directional movement relatively easy; (6) an apparatus designed for quick, efficient, economic hookup and disconnection; and (7) elimination of hose scuffing, crushing, kinking, fouling, or other damage.

The inventive features of this apparatus can also be profitably employed in other areas where normally heavy inner and outer boom arms are utilized, such as in cranes; aircraft cargo transfer such as lighter-than-air blimps, and the like; the transfer of cargo between vessels at sea and the like; and wherever random motion of one or both of the cargo transfer mediums makes cargo transfer operations difficult and normally places undue stress and weight on the transfer manifolds.

What is claimed is:

1. An apparatus which comprises, in combination, a support base to be firmly mounted in a given axial plane in a relatively fixed position, an inner boom arm; means engaging said base for movement thereon in said given axial plane, means connecting said inner boom arm pivotally to said means so engaging said base, an outer boom arm pivotally connected to said inner boom; and counterbalancing means to substantially counterbalance the inner boom and the outer boom when in an essentially vertical position, and to substantially counterbalance the outer boom arm in an operating position.

2. An apparatus for the transfer of petroleum from and to marine vessels and the like, which comprises in combination: (1) a support base to be firmly mounted in a relatively fixed position; (2) a column mounted above said base and on a support platform; (3) motive means for rotational movement of said column about its axis; (4) a carriage slidably mounted on said column for reciprocal vertical movement on said column and capable of rotation with said column; (5) motive means for reciprocal vertical movement of said carriage on said column; (6) an inner boom arm pivotally connected to said carriage for movement in a plane substantially vertical to the said column; (7) an outer boom arm pivotally connected to said inner boom arm for movement in a plane substantially the same as the inner boom arm; (8) a counterweight on said inner boom arm which in combination with the inner boom arm weight substantially counterbalances the weight of the inner boom arm and the outer boom arm in an essentially vertical position; and (9) motive means for the movement of the outer boom arm into any operating position, which means will, in addition, transmit movement to said counterweight so as to substantially counterbalance the outer boom arm in all operating positions, whereby on failure of the motive means, said inner and outer boom arms will gradually assume a rest position.

3. An apparatus as defined in claim 2 wherein said apparatus contains additionally a support leg pivotally attached to the said column and support platform, and pivotally connected to the inner boom arm at a pivot point between the support platform and the outer boom arm, whereby said upper pivot point serves as an additional distribution point of the weight of the inner boom arm and outer boom arm when the inner boom arm is placed in an operating position.

4. An apparatus as defined in claim 2 wherein said motive means of the said apparatus are fluid operating means.

5. An apparatus as defined in claim 2 wherein said counterweight is rotatably mounted and is rotated by cable means to substantially counterbalance the outer boom arm in all operating positions.

6. An apparatus as defined in claim 2 wherein said counterweight balances the inner boom arm and the outer boom arm when in an essentially vertical position and counterbalances the outer boom arm in any operating position.

7. An apparatus as defined in claim 2 wherein said outer boom arm contains at its terminal end an automatic control platform, which control platform contains sensing means which activates said motive means to automatically compensate for any movement of a marine vessel.

8. In a fluid transfer device whereby directional movement of a transfer carrier is automatically compensated for so as to maintain a minimum of weight on carrier manifolds, which device comprises in combination: (1) a base platform to be substantially horizontally supported at a terminal end of the fluid transfer device; (2) a kingpin freely mounted in a neutral position and capable of movement in any direction; (3) said transfer device having a fluid transfer conduit attached to one end of said kingpin and capable of movement with said kingpin; (4) means actuated on movement of the kingpin from the neutral position to return the kingpin to its neutral position.

9. A control platform as defined in claim 8 wherein said kingpin is tensionally mounted on and extends through said control platform.

10. In a fluid transfer device whereby directional movement of a transfer carrier is automatically compensated for so as to maintain a minimum of weight on carrier manifolds, which device comprises in combination: (1) a base platform to be substantially horizontally supported at a terminal end of a fluid transfer apparatus; (2) a kingpin tensionally mounted on and extending through a control platform in a neutral position and capable of movement in any direction; (3) a yoke bar attached to said kingpin for movement with said kingpin; (4) two support arms attached to each end of said yoke bar and each arm being attached to a fluid transfer conduit whereby movement of the conduits is transferred to the kingpin; (5) vertical actuating mechanism whereby vertical movement of the kingpin will actuate the vertical actuating mechanism of the transfer device to return the kingpin to a neutral position; (6) horizontal actuating mechanism whereby horizontal movement of the kingpin will actuate the horizontal actuating mechanism of the transfer device to return the kingpin to a neutral position; (7) longitudinal actuating mechanism whereby longitudinal movement of the kingpin will actuate the longitudinal actuating mechanism of the transfer device to return the kingpin to a neutral position.

11. An apparatus as defined in claim 10 wherein said vertical actuating mechanism comprises in combination: (1) a disc axially mounted on said king pin; (2) a lever arm, one end of which is forked, and between which forks the said disc is located; (3) actuating means attached to said lever arm, whereby vertical displacement of the kingpin will actuate the vertical actuating mechanism of the transfer device to return the kingpin to a neutral poistion.

12. An apparatus as defined in claim 10 wherein said longitudinal and horizontal actuating mechanisms comprise in combination: (1) two control stops substantially perpendicular to each other, each stop surrounding the kingpin and being elongated whereby substantial movement is permitted in one direction while slight perpendicular movement in the opposite direction actuates the control stop, and (2) two separate actuating means whereby movement of the kingpin out of a neutral position by virtue of planar movement will actuate either the longitudinal or horizontal actuating mechanism of the transfer device to return the kingpin to a neutral position.

13. An apparatus which comprises, in combination, a support base to be firmly mounted in a relatively fixed position, an inner boom arm pivotally connected to said support base, an outer boom arm pivotally connected to said inner boom arm for connection to a manifold, counterbalancing means to substantially counterbalance the inner boom and the outer boom, an automatic control platform, sensing means on said control platform communicating with said outer boom arm, sensing movement of a manifold, and motive means actuated thereby, moving said boom arms to automatically compensate for such movement, whereby excessive strain is prevented from being placed on the manifold.

14. An apparatus as defined in claim 13 wherein said motive means moves said inner boom arm and outer boom arm in longitudinal, horizontal, and vertical positions.

15. An apparatus comprising a support base to be firmly mounted in a relatively fixed position, an inner boom arm pivotally connected to said support base, an outer boom arm pivotally connected to said inner boom, and counterbalancing means connected to the inner boom arm at a given point for movement relative to said point of connection, and means connecting said counterbalancing means with the outer boom arm for movement of said counterbalancing means relative to the inner boom arm given point of connection on movement of the outer boom arm, to substantially counterbalance the outer boom arm.

16. An apparatus comprising a support base to be firmly mounted in a relatively fixed position, an inner boom arm pivotally connected to said support base, an outer boom arm pivotally connected to said inner boom, counterbalancing means connected to the inner boom arm at a given point for movement about said point of connection, and means connecting said counterbalancing means with the outer boom arm for movement of said counterbalancing means about said point of connection on movement of the outer boom arm, to substantially counterbalance the outer boom arm.

17. An apparatus comprising a support base to be firmly mounted in a relatively fixed position, an inner boom arm pivotally connected to said support base, an outer boom arm pivotally connected to said inner boom arm, an elongated arm pivotally connected to the inner boom arm, a counterweight fixed to said elongated arm at a point spaced from the point of pivotal connection of said elongated arm to said inner boom arm for movement of said counterweight about said point of connection with said elongated arm on movement of the latter thereabout, and means connecting said elongated arm with the outer boom arm for movement of said elongated arm, and thereby of said counterbalancing means about said point of connection on movement of the outer boom arm, to substantially counterbalance the outer boom arm.

18. An apparatus for the transfer of cargo which comprises in combination, a support base firmly mounted in a relatively fixed position, an inner boom arm pivotally connected to said support base for movement in a plane substantially parallel to said support base, an outer boom arm pivotally connected to said inner boom arm, and rotatable counter-balancing means to substantially counterbalance the inner boom arm and the outer boom arm when in an essentially vertical position and to substantially counterbalance the outer boom arm in all operating positions.

References Cited in the file of this patent

UNITED STATES PATENTS

| | | |
|---|---|---|
| 1,446,648 | Kostlan | Feb. 27, 1923 |
| 1,527,774 | Bettencount | Feb. 24, 1925 |
| 2,250,227 | Kiel | July 22, 1941 |
| 2,361,214 | Krone et al. | Oct. 24, 1944 |
| 2,697,442 | Anschutz | Dec. 21, 1954 |
| 2,914,080 | Silveston | Nov. 24, 1959 |